United States Patent
Tsou et al.

(10) Patent No.: US 10,246,542 B2
(45) Date of Patent: Apr. 2, 2019

(54) ATACTIC POLYPROPYLENE COMB BLOCK POLYOLEFINS USEFUL AS MODIFIERS IN POLYOLEFINS AND HYDROCARBONS

(71) Applicant: ExxonMobil Chemical Patents Inc., Baytown, TX (US)

(72) Inventors: Andy H. Tsou, Houston, TX (US); George Rodriguez, Houston, TX (US); Carlos R. Lopez-Barron, Houston, TX (US); Donna J. Crowther, Seabrook, TX (US); Hillary L. Bradshaw, Houston, TX (US); Antonios K. Doufas, Baytown, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 31 days.

(21) Appl. No.: 15/214,133

(22) Filed: Jul. 19, 2016

(65) Prior Publication Data

US 2017/0073448 A1    Mar. 16, 2017

Related U.S. Application Data

(60) Provisional application No. 62/218,258, filed on Sep. 14, 2015.

(51) Int. Cl.
*C08L 23/08* (2006.01)
*C08L 23/12* (2006.01)
*C08F 290/04* (2006.01)
*C08F 10/06* (2006.01)
*C08F 4/659* (2006.01)

(52) U.S. Cl.
CPC .......... *C08F 290/042* (2013.01); *C08F 10/06* (2013.01); *C08L 23/0815* (2013.01); *C08L 23/12* (2013.01); *C08F 4/65908* (2013.01); *C08F 4/65912* (2013.01); *C08L 2207/14* (2013.01)

(58) Field of Classification Search
CPC ....... C08F 290/042; C08L 23/06; C08L 23/12
See application file for complete search history.

(56) References Cited

U.S. PATENT DOCUMENTS

| 6,147,180 A | 11/2000 | Markel et al. |
| 6,197,910 B1 | 3/2001 | Weng et al. |
| 6,897,261 B1 | 5/2005 | Machida et al. |

FOREIGN PATENT DOCUMENTS

WO    2014/120478    8/2014

OTHER PUBLICATIONS

Eckstein et al., "*Determination of Plateau Moduli and Entanglement Molecular Weights of Isotactic, Syndiotactic, and Atactic Polypropylenes Synthesized with Metallocene Catalysts*", Macromolecules 1998, vol. 31, pp. 1335-1340.

Huang et al., "*Dependece of Slow Crack Growth in Polyethylene on Butyl Branch Density: Morphology and Theory*", Journal of Polymer Science: Part B: Polymer Physics, vol. 29, pp. 129-137 (1991).

Matsuo et al., "*Orientation Mode of Crystallites and Rodlike Texture of Polyethylene Crystallized from a Stressed Polymer Melt*", Macromolecules 1980, vol. 13, pp. 1194-1198.

Sun et al., "*Effect of Short Chain Branching on the Coil Dimensions of Polyolefins in Dilute Solution*", Macromolecules 2001, vol. 34, pp. 6812-6820.

*Primary Examiner* — Jeffrey C Mullis
(74) *Attorney, Agent, or Firm* — Kevin M. Faulkner

(57) ABSTRACT

An atactic polypropylene comb-block polyolefin comprising two blocks including a polyolefin backbone and atactic polypropylene combs pendant to the backbone having a weight average molecular weight of at least 8000 g/mole and a crystallinity of less than 20%, where the atactic polypropylene comb-block polyolefin has comb number of at least 2. The atactic polypropylene comb-block polyolefin is made by contacting at a temperature within a range from 20 to 70° C. propylene with a first metallocene precursor to form vinyl-terminated atactic polypropylene to form vinyl-terminated atactic polypropylene, then contacting at a temperature within a range from 40 to 150° C. the vinyl-terminated atactic polypropylene with ethylene, propylene, or both and a second metallocene precursor to form the backbone.

15 Claims, 7 Drawing Sheets

ATACTIC POLYPROPYLENE COMB BLOCK POLYOLEFINS USEFUL AS MODIFIERS IN POLYOLEFINS AND HYDROCARBONS

PRIORITY

This invention claims priority to and the benefit of U.S. Patent Application Ser. No. 62/218,258, filed Sep. 14, 2015, which is herein incorporated by reference.

FIELD OF THE INVENTION

The present invention relates to comb-block polyolefins useful as modifiers in linear polyolefin compositions and in hydrocarbon fluids and methods of making them, and in particular to atactic polypropylene comb-block polyethylenes and polypropylenes.

BACKGROUND OF THE INVENTION

Linear polyolefins that must be processed by melt extrusion (e.g., above 60° C.), such as high density polyethylene (HDPE), linear low density polyethylene (LLDPE), and isotactic polypropylene (iPP) do not exhibit extensional flow hardening, which is a critical property for film blowing, thermoforming, extrusion casting, and foaming. Commonly, a processability "modifier" such as a long chain branched polyolefin can be added in small amounts to linear polyolefins to provide extensional hardening. So called "tree branched", "dendritic", and "combed" polyolefin structures are known long chain branch types that can deliver extensional flow hardening when they are added into the linear polymers. Most commonly, high pressure low density polyethylene (LDPE) having a variety of long chain branches is used as a processability additive in linear polyethylenes to enhance the blown film line speed and to provide melt strength for thermoforming. However, long chain branched polyolefins have lower toughness and their addition often compromises the mechanical properties of the linear polyolefins to which they are added. In the case of LDPE, its uses have been limited to be 20 wt % or less of the overall composition but even at 5 wt % addition the impact strength of a LLDPE would drop by 50%. Due to heterogeneous branch types present in the LDPE with ineffective star branches diluting the more effective dendritic branches, a large amount, greater than 5%, of LDPE is necessary to have any processability benefits. It is desirable to use effective long chain branched polyolefins at an amount of 5% or less that can deliver extensional flow hardening but without compromising mechanical properties.

It has been found that for an effective "comb-block polyolefin" structure to provide processability enhancement, it should possess a polyolefin backbone miscible/compatible with a linear polyolefin matrix, while possessing a comb length greater than the entanglement molecular weight in order to deliver extensional flow hardening in a linear polyolefin matrix at 1 wt % addition of the comb-block polyolefin. This is not always the case with modifiers on the market. Providing such a modifier for linear polyolefins would be highly beneficial.

Likewise for hydrocarbon and polyolefins materials that are liquid at room temperature, there is a desire to employ small amounts of viscosity modifiers to thicken hydrocarbon liquids and improve fuel efficiency in the engines in which it is used. The larger coil dimensions of polyolefin copolymers in a hydrocarbon liquid (or solvent) provide excellent thickening efficiency. However, most are linear and do not shear thin until very high shear rates thus minimizing their impact on reducing high-shear-rate viscosity/viscous loss and on improving fuel economy. Long chain branched viscosity modifiers are beneficial for shear thinning and for fuel economy, and there are multi-arm star polyolefin materials presently in the market place based on poly(hydrogenated isoprene-co-styrene) copolymers with hydrogenated polyisoprene having star arms of 20 to 40 centered on a cross-linked polystyrene core. These long chain branches deliver earlier shear thinning onset in a hydrocarbon base stock for lower viscosity at high shear rates and better fuel economy. However, their thickening efficiency is poor due to the coil dimensional shrinkage as a result of long chain branching and they are easily oxidized and degraded as a result of the presence of oxidation-prone polystyrene.

In accordance to Huang-Brown tie-chain theory (Huang, Y.-L., Brown, N, 29 J. POLYM. SCI., PART B. POLYM. PHYS., 129 (1991)), maintaining the crystallize size while reducing the coil dimension leads to fewer tie chains in-between the crystallites and thus lower toughness. This toughness erosion depends on the branch type. Providing a modifier with increased comb-branching lowers the coil dimension the least in comparison with increasing branching in star-type polyolefins or increasing generation of dendritics and tree type-structures. This lowered coil shrinkage with increasing long chain branch length (molecular weight) in comb polyolefins also makes them more desirable than star polyolefins as viscosity modifiers in hydrocarbon liquids (fluids) since its thickening efficiency, depending on the coil dimension, is less compromised while still delivering shear thinning and fuel economy.

Poly(propylene-b-isotactic propylene) comb-block copolymers were synthesized in U.S. Pat. No. 6,197,910 to Weng et al., but the isotactic combs along with the isotactic backbone does not lend itself to being compatible with base stocks or polyethylene blends.

Poly(ethylene/propylene-b-atactic propylene) comb-block copolymers were synthesized in WO 2014/120478 to Jiang et al., but having atactic polypropylene combs having a weight average molecular weight of less than 5,500 g/mole in the examples of that patent publication, which is too short for ideal flow hardening.

Poly(ethylene/propylene-b-isotactic propylene) comb-block copolymers were disclosed in U.S. Pat. No. 6,147,180 to Markel et al., the isotactic arms not suitable for compatibility in most compositions.

These and other problems are solved by providing atactic polypropylene comb-block polyolefins having combs (or "comb blocks") with a weight average molecular weights greater than 8,000 g/mole, greater than the entanglement weight average molecular weight of atactic propylene which is 7,000 g/mole. The proper comb length imparts the extensional flow hardening when the comb block is used as a processability modifier in linear PE, in PP, or PE/PP blend matrix. This longer comb length also expands the solution coil dimensions allowing its use as a viscosity modifier in liquid hydrocarbons or polyolefins.

SUMMARY OF THE INVENTION

Disclosed is a process for preparing atactic polypropylene comb-block polyolefins comprising contacting, at a temperature within a range from 20 to 55 or 60 or 65 or 70° C., propylene with a first metallocene precursor and an activator to form vinyl-terminated atactic polypropylene having a weight average molecular weight of at least 8000 or 10,000 g/mole and a crystallinity of less than 20 or 10 or 5%; and contacting, at a temperature within a range from 40 to 55 or 60 or 70 or 90 or 130 or 150° C., the vinyl-terminated atactic polypropylene with ethylene, propylene, or both, a second metallocene precursor, and an activator to form atactic polypropylene comb-block polyolefins.

Also disclosed is an atactic polypropylene comb-block polyolefin comprising two blocks: a polyolefin backbone; and atactic polypropylene combs pendant to the backbone having a weight average molecular weight of at least 8,000, or 10,000 g/mole and a crystallinity of less than 20 or 10 or 5%; wherein the atactic polypropylene comb-block polyolefin has a comb number of at least 2 or 4 or 6 or 10.

DETAILED DESCRIPTION OF THE INVENTION

Figure 1:
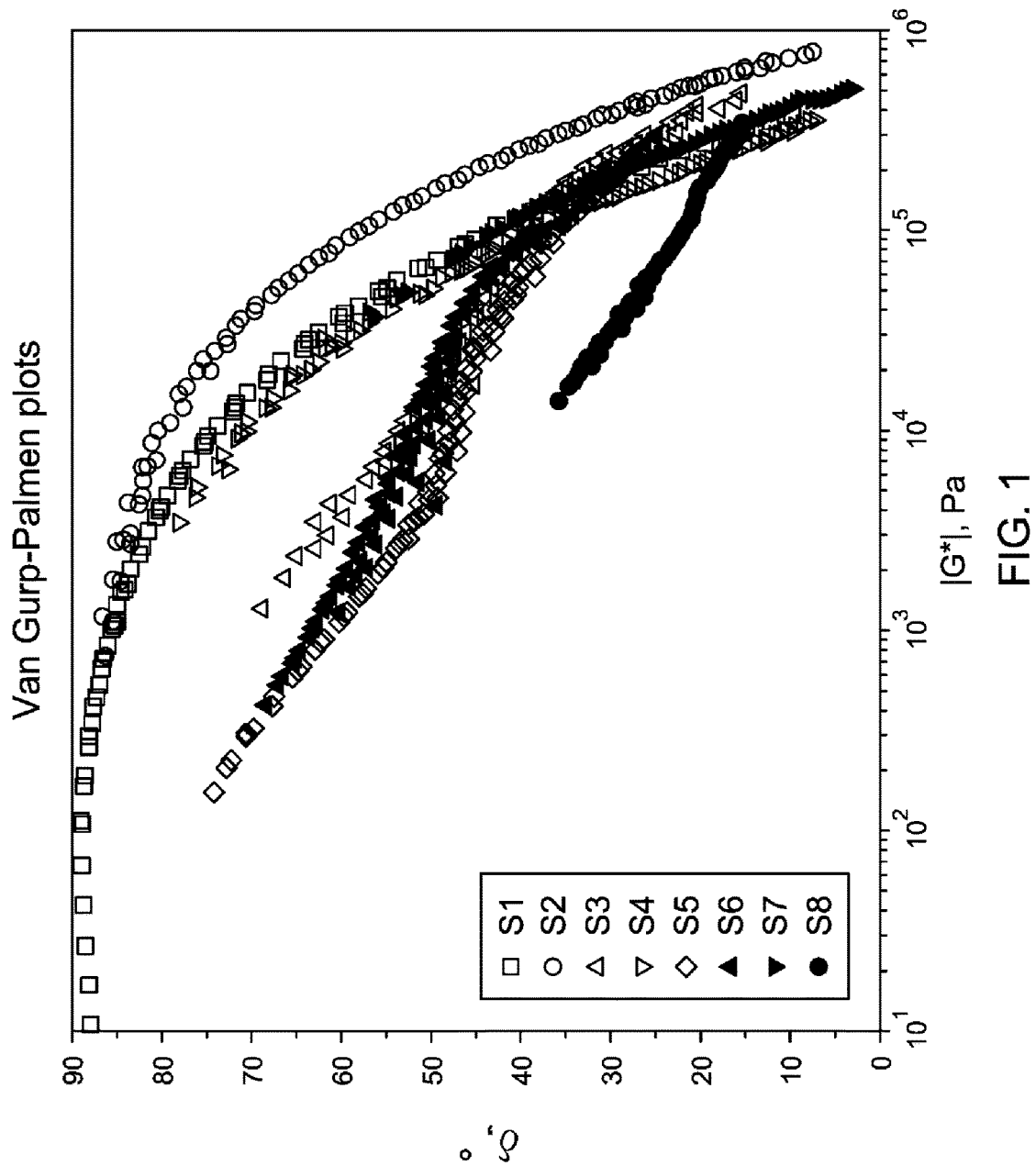
FIG. 1 is a Van Gurp-Palmen plot of various inventive atactic polypropylene comb-block polyolefins, which is a plot of the phase angle (tangent angle corresponding to the ratio of shear loss modulus to shear storage modulus) plotted against complex shear modulus.

Addition of long chain branched polyolefins to linear polyolefins as a blend leads to toughness erosion, as discussed above, especially when larger amounts are used. Also, most hydrocarbon fluid modifiers are linear and do not offer the best shear thinning at high shear rates, and those that are not linear may improve shear thinning, but not thickening efficiency. To solve these and other problems is provided an atactic polypropylene comb-block polyolefin comprising two covalently bound blocks comprising a polyolefin backbone, and atactic polypropylene branches or "combs" pendant to the backbone having a weight average molecular weight of at least 8,000 or 10,000 g/mole and a crystallinity of less than 20 or 10 or 5%, and wherein the atactic polypropylene comb-block polyolefin has comb number (number of branches pendant to the backbone polyolefin) of at least 2 or 4 or 6 or 10.

To achieve this is provided a process wherein a vinyl-terminated atactic polypropylene is generated, followed by incorporation of that vinyl-terminated atactic polypropylene into a forming polyolefin backbone, either polypropylene having branches derived from the vinyl-terminated atactic polypropylene or polyethylene having branches derived from the vinyl-terminated atactic polypropylene, the whole structure referred to as a "comb" structure. Thus, provided is a process for preparing the atactic polypropylene comb-block polyolefins comprising contacting, at a temperature within a range from 20 to 55 or 60 or 65 or 70° C. of propylene with a first metallocene precursor and an activator to form vinyl-terminated atactic polypropylene having a weight average molecular weight of at least 8,000 or 10,000 g/mole and a crystallinity of less than 20 or 10 or 5%; and contacting, at a temperature within a range from 40 to 55 or 60 or 70 or 90 or 130 or 150° C., the vinyl-terminated atactic polypropylene with ethylene, propylene, or both, a second metallocene precursor, and an activator to form atactic polypropylene comb-block polyolefins. The "contacting" may occur as two steps together in one reactor, in two separate zones in one reactor, or in separate reactors such as in series reactors.

The crystallinity of the vinyl-terminated atactic polypropylenes (and the combs pendant to the polyolefin backbone by inference) used to make the inventive comb block polyolefins described herein are measured using Differential Scanning calorimetry (DSC) using commercially available equipment such as a TA Instruments 2920 DSC. Typically, 6 to 10 mg of the sample, that has been stored at 25° C. for at least 48 hours, is sealed in an aluminum pan and loaded into the instrument at 25° C. The sample is equilibrated at 25° C., then it is cooled at a cooling rate of 10° C./min to −80° C., to obtain heat of crystallization (Tc). The endothermic melting transition, if present, is analyzed for onset of transition and peak temperature. The heats of melting, $\Delta H_m$, and cold crystallization, $\Delta H_c$, are determined by integrating the areas (J/g) under the peaks. Depending upon the sample's given thermal history, a cold crystallization exothermic peak may or may not be observed during the DSC experiment.

The percent crystallinity of the vinyl-terminated atactic polypropylene (and the combs pendant to the polyolefin backbone by inference) is calculated using the following equation:

$$\% \text{ Crystallinity} = ([\Delta H_m - \Delta H_c]/\Delta H_m) \cdot 100\%$$

In this equation, the heats of melting and cold crystallization are in terms of J/g. The term $\Delta H_m$ is a reference value and represents the heat of melting if the polymer were 100% crystalline. This reference heat of melting has been established for each of the commonly used polymers, and for polypropylene the $\Delta H_m$ is 207.1 J/g.

Metallocene Catalyst Precursors and Activators

The inventive process takes place in two steps or stages, each step/stage preferably requiring a different metallocene catalyst precursor. In any embodiment, the first and second contacting steps take place in the same reactor, but at different times. Thus, a first metallocene is used in a first contacting stage or step until the polymerization reaction has run for a desired amount of time, followed by addition of a second metallocene catalyst in a second step. Alternatively, the first contacting may take place in a different reactor than the second contacting stage or step, such as in serial reactors where the reaction effluent from the first reactor is transferred to the second reactor, at least in part or whole, in a continuous process. In such a serial reaction scheme, a first metallocene can be added to the first reactor, followed by addition of a second metallocene to a second reactor along with the effluent from the first reactor. These polymerization steps take place at different temperatures as indicated above, and may take place at the same or different pressures, preferably a pressure of at least 1 or 2 MPa, or within a range from 1 or 2 MPa to 4 or 6 or 8 MPa.

In any case, the first stage is preferably the stage in which a vinyl-terminated atactic polypropylene is formed and thus a first metallocene that favors the formation of vinyl-terminated atactic polypropylenes is desirable. In any embodiment, the first metallocene precursor is selected from the group consisting of bridged $C_2$ symmetric hafnocenes and zirconocenes; preferably symmetrically C1 to C6 alkyl substituted. Most preferably, the first metallocene (and/or second metallocene) is selected from those having the following structure, especially desirable for producing atactic polypropylene or isotactic polypropylene, depending upon the substitution pattern on the indenyl ring(s):

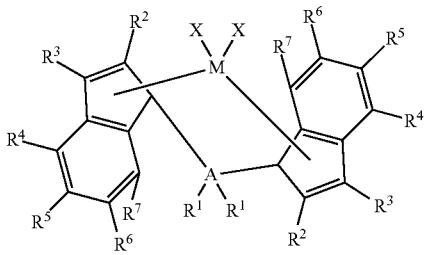

wherein:

M is a Group 4 (titanium, zirconium, hafnium) metal, preferably Zr or Hf, most preferably Hf;

each X is independently a halogen or C1 to C10 alkyl, or C6 to C10 aryl;

"A" is a methylene or ethylene, wherein the ethylene has two $R^1$ groups on each carbon, or "A" is a silane;

each $R^1$ is independently selected from hydrogens, C1 to C10 alkyls, and C6 to C10 aryls;

each of $R^2$ to $R^7$ is independently selected from hydrogens, C1 to C10 alkyls, C6 to C10 aryls, C7 to C24 alkylaryls, and C7 to C24 arylalkyls;

preferably each of $R^5$ to $R^7$ are hydrogen, $R^2$ is a C1 to C4 alkyl, and $R^3$ is a C2 to C6 alkyl; and wherein $R^2$ and $R^3$ may form a C4 to C7 saturated or unsaturated ring.

The second stage or step of the process is, preferably, one in which a backbone polyolefin is formed in the presence of the reactor effluent of the first stage or step, which contains vinyl-terminated atactic polypropylene. Thus, desirably the second metallocene catalyst is chosen that favors the incorporation of vinyl-terminated polyolefins as a monomer unit while forming the backbone polyolefin. In any embodiment, the second metallocene precursor is selected from $C_s$ symmetric bis-cyclopentadienyl Group 4 complexes, $C_2$ symmetric bis-cyclopentadienyl Group 4 complexes, and mono-cyclopentadienyl Group 4 complexes. Most preferably, the second metallocene precursor may be selected from those having the following structure, especially when syndiotactic polypropylene or polyethylene is desired for the backbone polyolefin:

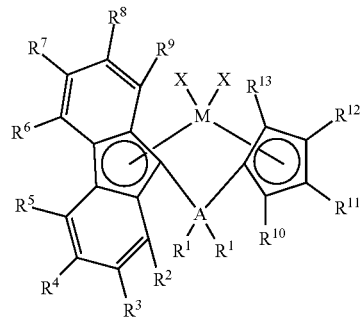

wherein:

M is a Group 4 metal, preferably Zr or Hf;

each X is independently a halogen or C1 to C10 alkyl, or C6 to C10 aryl;

"A" is a methylene or ethylene, wherein the ethylene has two $R^1$ groups on each carbon, or "A" is a silane;

each $R^1$ is independently selected from hydrogens, C1 to C10 alkyls, and C6 to C10 aryls;

each of $R^2$ to $R^{13}$ is independently selected from hydrogens, C1 to C10 alkyls, C6 to C10 aryls, C7 to C24 alkylaryls, and C7 to C24 arylalkyls;

preferably each of $R^3$ and $R^8$ are a C2 to C6 iso- or tert-alkyls, and the other R groups are hydrogen; and wherein $R^2$ and $R^3$ may form a C4 to C7 saturated or unsaturated ring.

Also, in any embodiment, the second metallocene precursor may, preferably, be selected from those having the following structure, especially when atactic polypropylene is desired for the backbone polyolefin:

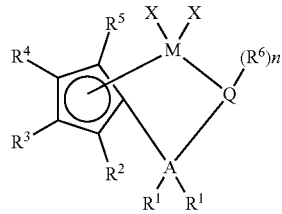

wherein:

M is a Group 4 metal, preferably Ti;

each X is independently a halogen or C1 to C10 alkyl, or C6 to C10 aryl;

"A" is a methylene or ethylene, wherein the ethylene has two $R^1$ groups on each carbon, or "A" is a silane;

Q is a heteroatom or hydrocarbon group;

preferably a carbon, nitrogen, silicon, or phosphorous;

wherein "n" is 1, 2, or 3;

each $R^1$ is independently selected from hydrogen, C1 to C10 alkyls, and C6 to C10 aryls;

each of $R^2$ to $R^5$ is independently selected from hydrogens, C1 to C10 alkyls, C6 to C10 aryls, C7 to C24 alkylaryls, and C7 to C24 arylalkyls; and wherein $R^6$ is selected from C1 to C10 alkyls, and C4 to C20 saturated or unsaturated rings.

In any embodiment, the "activator" comprises any compound capable of converting the catalyst precursor into an active polymerization catalyst, and preferably includes alkyl alumoxane compounds (e.g., methylalumoxane) and/or tetra (perfluorinated aromatic)borates, but more preferably comprises tetra(perfluorinated aromatic)borates. Even more preferably, the activator comprises anions selected from tetra(pentafluorophenyl)borate, tetra(perfluorobiphenyl)borate, tetra(perfluoronaphthyl)borate, and combinations thereof. In the case of anionic activators, the activator also comprises a bulky organic cation (trialkyl ammonium, trialkylmethyl), preferably dialkylanilinium cation, or triphenylmethyl cation.

Regardless of the catalyst, given the likely presence of the first metallocene catalyst in the second contacting stage or step which may have varying degrees of activity at that stage, in any embodiment the inventive process further comprises forming a linear low molecular weight component (LLMW) in the second step comprising ethylene or ethylene/propylene copolymers and having a number average molecular weight within a range from 7,000 to 50,000 g/mole. Thus, the atactic polypropylene comb-block polyolefins formed herein may be a composition that also includes the LLMW in as much as 2 or 4 or 6 wt % to 10 or 20 wt %.

Atactic Polypropylene Comb-Block Polyolefins

The atactic polypropylene comb-block polyolefins are block copolymers comprising atactic polypropylene block(s) and a polyolefin block. The atactic polypropylene blocks are essentially branches pendant to the polyolefin backbone, thus having a "comb" structure. The inventive structures have comb number (number of branches pendant to the backbone polyolefin) of 2 or 4 or 6 or 10 or more; or within a range from 2 or 4 or 6 or 10 to 20 or 24 or 28 or 32. Also, in any embodiment, the atactic polypropylene comb-block polyolefin (preferably polyethylene) exhibits a CH branching number (mol %, $^{13}$C NMR) greater than 1 or 1.5 or 2, or within a range from 1 or 1.5 or 2 to 7 or 9 or 12 or 15. Preferably, the GPC of the atactic polypropylene comb-block polyolefins exhibits bimodal molecular weight distribution, most preferably when serial reactors are used to make the comb-block structures.

In any embodiment, the "backbone" polyolefin block is a polyethylene or polypropylene; more preferably selected from isotactic polypropylenes, a syndiotactic polypropylenes, ethylene-propylene copolymers, polyethylenes (HDPE or LLDPE), and combinations thereof.

In any embodiment, the atactic polypropylene comb-block polyolefin has a weight average molecular weight (Mw) within the range from 100,000 or 200,000 or 250,000 g/mole to 300,000 or 500,000 or 750,000 or 900,000 g/mole, preferably when serial reactors are used to make the comb-block structures. In any embodiment, the atactic polypropylene comb-block polyolefins has a number average molecular weight (Mn) within the range from 4,000 or 6,000 or 7,000 g/mole to 20,000 or 30,000 or 40,000 or 50,000 g/mole, preferably when serial reactors are used to make the comb-block structures. In any embodiment, the atactic polypropylene comb-block polyolefins has a z-average molecular weight (Mz) of greater than 500,000 or 750,000 or 900,000 g/mole, or within a range from 500,000 or 750,000 or 900,000 g/mole to 1,500,000 or 2,000,000, or 2,500,000 g/mole, preferably when serial reactors are used to make the comb-block structures. Finally, the atactic polypropylene comb-block polyolefins preferably have a molecular weight distribution (Mw/Mn) greater than 10 or 30 or 50, or within a range from 10 or 30 or 50 to 100 or 140 or 160, preferably when serial reactors are used to make the comb-block structures.

The inventive atactic polypropylene comb-block polyolefin has a number of uses as a modifier present within the range from 0.05 or 0.1 or 0.5 wt % to 7 or 10 or 15 wt % of the composition in either polyolefin compositions, especially polypropylenes, polyethylenes, and blends containing polypropylene and polyethylene, where it acts as a modifier to improve the processability and performance of the composition. Similarly, within similar weight ratios, the inventive atactic polypropylene comb-block polyolefin is useful as a modifying additive in hydrocarbon fluids such as motor oils, where they are demonstrated herein to improve high temperature viscosity of such fluids.

The various descriptive elements and numerical ranges disclosed herein for the inventive atactic polypropylene comb-block polyolefins and process to make such polyolefins can be combined with other descriptive elements and numerical ranges to describe the invention(s); further, for a given element, any upper numerical limit can be combined with any lower numerical limit described herein, including the examples in jurisdictions that allow such combinations. The features of the inventions are demonstrated in the following non-limiting examples.

EXAMPLES

Test Methods

Molecular weights (number average molecular weight (Mn), weight average molecular weight (Mw), and z-average molecular weight (Mz)) were determined using a Polymer Laboratories Model 220 high temperature GPC-SEC equipped with on-line differential refractive index (DRI), light scattering (LS), and viscometer (VIS) detectors (so called GPC-3D, Gel Permeation Chromatography-3 Detectors). It used three Polymer Laboratories PLgel 10 m Mixed-B columns for separation using a flow rate of 0.54 ml/min and a nominal injection volume of 300 μL. The detectors and columns were contained in an oven maintained at 135° C. The stream emerging from the size exclusion chromatography (SEC) columns was directed into the miniDAWN (Wyatt Technology, Inc.) optical flow cell and then into the DRI detector, or IR detector for the data in FIGS. 3 and 4. The DRI detector was an integral part of the Polymer Laboratories SEC. The viscometer was inside the SEC oven, positioned after the DRI detector. The details of these detectors, as well as their calibrations, have been described by, for example, T. Sun, P. Brant, R. R. Chance, and W. W. Graessley, in 34(19) MACROMOLECULES, 6812-6820, (2001).

Molecular weights, molecular weight distributions, compositions, composition distributions, and long chain branching were also measured using Polymer Char GPC-IR. GPC-IR is a high temperature Gel Permeation Chromatograph or Size Exclusion Chromatograph (GPC/SEC) with an infrared detector, a built-in viscometer and a Multi-Angle Light Scattering (DAWN™ HELEOS™ II 8 or 18 angle of Wyatt Technology). This is also called GPC-4D, four detectors, since infrared detector measures both the concentration and composition. Counting concentration, composition, along with the viscosity from viscometer and the coil dimension from MALS (multi-angle light scattering), there are four parameters being measured using GPC-IR, hence, GPC-4D.

Solvent for the GPC-SEC was prepared by dissolving 6 grams of butylated hydroxy toluene as an antioxidant in 4 liters of Aldrich reagent grade 1,2,4-trichlorobenzene (TCB). The TCB mixture was then filtered through a 0.7 μm glass pre-filter and subsequently through a 0.1 μm Teflon filter. The TCB was then degassed with an online degasser before entering the SEC. Polymer solutions were prepared by placing dry polymer in a glass container, adding the desired amount of TCB, then heating the mixture at 160° C.

with continuous agitation for 2 hours. All quantities were measured gravimetrically. The TCB densities used to express the polymer concentration in mass/volume units were 1.463 g/mL at room temperature and 1.324 g/mL at 135° C. The injection concentration was from 1.0 to 2.0 mg/mL, with lower concentrations being used for higher molecular weight samples. Prior to running each sample the DRI detector and the injector were purged. Flow rate in the apparatus was then increased to 0.5 mL/minute, and the DRI was allowed to stabilize for 8 to 9 hours before injecting the first sample. The concentration, c, at each point in the chromatogram was calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 135° C. and λ=690 nm. For purposes of this invention and the claims thereto (dn/dc)=0.104 for propylene polymers and 0.1 otherwise. Units of parameters used throughout this description of the SEC method are: concentration is expressed in g/cm³, molecular weight is expressed in g/mol, and intrinsic viscosity is expressed in dL/g.

The light scattering detector was a high temperature miniDAWN (Wyatt Technology, Inc.). The primary components are an optical flow cell, a 30 mW, 690 nm laser diode light source, and an array of three photodiodes placed at collection angles of 45°, 90°, and 135°. The molecular weight, M, at each point in the chromatogram was determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient (for purposes of this invention, $A_2$=0.0006 for propylene polymers, 0.0015 for butene polymers and 0.001 otherwise), (dn/dc)=0.104 for propylene polymers, 0.098 for butene polymers and 0.1 otherwise, P(θ) is the form factor for a monodisperse random coil, and $K_O$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 135° C. and λ=690 nm.

A high temperature viscometer from Viscotek Corporation was used to determine specific viscosity. The viscometer has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer was calculated from their outputs. The intrinsic viscosity, [η], at each point in the chromatogram was calculated from the following equation:

$$\eta_s = c[\eta] + 0.3(c[\eta])^2$$

where c is concentration and was determined from the DRI output.

The branching index ($g'_{vis}$) is defined as the ratio of the intrinsic viscosity of the branched polymer to the intrinsic viscosity of a linear polymer of equal molecular weight and same composition, and was calculated using the output of the SEC-DRI-LS-VIS method as follows. The average intrinsic viscosity, $[\eta]_{avg}$, of the sample was calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as:

$$g'_{vis} = \frac{[\eta]_{avg}}{k M_v^\alpha}$$

The intrinsic viscosity of the linear polymer of equal molecular weight and same composition was calculated using the Mark-Houwink equation. For purpose of this invention and claims thereto, α=0.695 and k=0.000579 for linear ethylene homo-polymers are used. Linear homo-polyethylene is used for $g'_{vis}$ calculation without considering the comonomer content. $M_V$ is the viscosity-average molecular weight based on molecular weights determined by LS analysis. See 34 MACROMOLECULES, 6812-6820 (2001) and 38 MACROMOLECULES, 7181-7183 (2005), for guidance on selecting a linear standard having similar molecular weight and comonomer content, and determining k coefficients and cc exponents. The molecular weight data reported here are those determined using GPC DRI detector, and molecular weight data reported here for ethylene/macromonomer copolymers are those determined using GPC light scattering detector, unless otherwise noted.

Viscosity was measured using a Brookfield Viscometer according to ASTM D-3236.

Mn (¹H NMR) was determined according to the following NMR method. ¹H NMR data is collected at either room temperature or 120° C. (for purposes of the claims, 120° C. shall be used) in a 5 mm probe using a Varian spectrometer with a ¹H frequency of 250 MHz, 400 MHz, or 500 MHz (for the purpose of the claims, a proton frequency of 400 MHz is used). Data were recorded using a maximum pulse width of 45° C., 8 seconds between pulses and signal averaging 120 transients. Spectral signals were integrated and the number of unsaturation types per 1000 carbons was calculated by multiplying the different groups by 1000 and dividing the result by the total number of carbons. Mn is calculated by dividing the total number of unsaturated species into 14,000, and has units of g/mol.

In conducting the ¹³C NMR investigations, samples were prepared by adding 0.3 g sample to approximately 3 g of tetrachloroethane-d2 in a 10 mm NMR tube. The samples were dissolved and homogenized by heating the tube and its contents to 150° C. The data were collected using a Varian spectrometer, with corresponding ¹H frequencies of either 400 or 700 MHz (in event of conflict, 700 MHz shall be used). The data were acquired using nominally 4000 transients per data file with a 10 second pulse repetition delay. To achieve maximum signal-to-noise for quantitative analysis, multiple data files were added together. The spectral width was adjusted to include all the NMR resonances of interest and FIDs were collected containing a minimum of 32K data points. The samples were analyzed at 120° C. in a 10 mm broad band probe.

Melting temperature ($T_{m2}$) was measured using Differential Scanning calorimetry (DSC) using commercially available equipment such as a TA Instruments 2920 DSC. Typically, 6 to 10 mg of the sample, that has been stored at room temperature for at least 48 hours, is sealed in an aluminum pan and loaded into the instrument at room temperature. The sample is equilibrated at 25° C., then it is cooled at a cooling rate of 10° C./min to −80° C., to obtain heat of crystallization (Tc). The sample is held at −80° C. for 5 min and then heated at a heating rate of 10° C./min to 25° C. The glass transition temperature (Tg) is measured from the heating cycle. Otherwise, the sample is equilibrated at 25° C., then heated at a heating rate of 10° C./min to 150° C. The endothermic melting transition, if present, is analyzed for onset of transition and peak temperature. The melting temperatures reported ($T_{m2}$) are the peak melting temperatures from the second heat unless otherwise specified. For samples displaying multiple peaks, the melting point (or melting temperature) is defined to be the peak melting temperature (i.e., associated with the largest endothermic calorimetric response in that range of temperatures) from the DSC melting trace. The $T_{m2}$ is measured to within ±0.2° C.

A. Viscosity Modifier Example

Propylene polymerization reactions were carried out in a well-stirred 1 liter batch reactor equipped to perform coordination polymerization in the presence of an inert hydrocarbon (hexane) solvent at pressures up to 500 psig and temperatures up to 150° C. In the vapor-liquid polymerization system, the polymerization occurred in the liquid phase where propylene was fed into the reactor prior to the addition of the catalyst solutions. In all experiments, the reactor temperature was kept set as shown in the Tables below by electronically controlling the amount of steam added to the reactor jacket. In a typical experiment, hexanes were fed into the dry reactor. One ml toluene solution of TIBAL (tri-isobutyl aluminum) was added to the reactor. Propylene was added to the reactor. The reactor was sealed and heated. The catalyst solution (catalyst precursor and activator dissolved in toluene) was added to the reactor. Polymerization began immediately upon addition of the catalyst, and was allowed to continue under controlled temperature for the indicated times. When appropriate, the second stage was completed by adding a solution of the second catalyst/activator as shown in Table 1B. After the indicated time, the reactor was allowed to reach room temperature and depressurized by venting. The polymerization solution was poured into an aluminum tray. The polymer was collected and allowed to dry over 16 h under ambient condition. The polymer was dried further under vacuum at 60° C. Polymerization results are presented in Tables 1A and 1B for each samples modifier ("Sample") produced, and a description of the results or the rheological measurements (Van Gurp-Palmen plots) as shown in FIG. 1, and summarized in Table 1C.

The catalyst precursors and activators were as follows:
(1) rac-dimethylsilyl bis(2-methyl-3-propyl-indenyl) hafnium dimethyl activated by dimethylanilinium tetrakis(heptafluoro-2-naphthyl)borate;

(2) dimethylsilyl bis(tetramethylcyclopentadienyl)(cyclododecylamido) titanium dimethyl activated by dimethylanilinium tetrakis(pentafluorophenyl)borate:

(3) p-triethylsilylphenylcarbyl bis(cyclopentadienyl)(2,7-di-t-butylfluorenyl) zirconium dimethyl;

(4) dimethylsilyl bis(indenyl) hafnium dimethyl activated by dimethylanilinium tetrakis(pentafluorophenyl)borate; and (5) rac-dimethylsilyl bis(2-methyl-3-propyl-indenyl) hafnium dimethyl activated by dimethylanilinium tetrakis(pentafluorophenyl)borate.

TABLE 1A

First Stage Polymerization Conditions for Viscosity Modifier Example

| Sample | catalyst precursor | catalyst/ activator, mg | Temp (° C.) | Run time (min) |
|---|---|---|---|---|
| 1 | 1 | 4.0/4.0 | 35 | 22 |
| 2 | 3 | 10/12.2 | 35 | 7 |
| 3 | 1 | 3/5.9 | 35 | 20 |
| 4 | 4 | 2/5.2 | 35 | 10 |
| 5 | 1 | 2.9/6.0 | 35 | 35 |
| 6 | 1 | 3.0/5.9 | 35 | 20 |
| 7 | 2 | 10.3/27.5 | 35 | 5 |
| 8 | 1 | 3.0/5.9 | 35 | 19 |

TABLE 1B

Second Stage Polymerization Conditions for Viscosity Modifier Example

| Sample | Catalyst | catalyst/ activator, mg | Temp (° C.) | Run time (min) | Hexane | Propylene |
|---|---|---|---|---|---|---|
| 1 | — | — | — | — | 800 | 600 |
| 2 | — | — | — | — | 1000 | 400 |
| 3 | 3 | 12/15.3 | 35 | 15 | — | — |
| 4 | — | — | — | — | 1000 | 400 |
| 5 | 4 | 5.1/12.2 | 50 | 5 | 1000 | 400 |
| 6 | 4 | 3.0/7.2 | 60 | 10 | 1000 | 400 |
| 7 | — | — | — | — | 1000 | 400 |
| 8 | 2 | 4.0/11.0 | 45 | 10 | — | — |

TABLE 1C

Summary Conclusions from Van Gurp-Palmen Plots

| Sample | $1^{st}$ stage catalyst | $2^{nd}$ stage catalyst | Type | Stereotacticity* |
|---|---|---|---|---|
| 1 | 1 | — | Linear | aPP |
| 2 | 3 | — | Linear | sPP |
| 3 | 1 | 3 | Comb-block | sPP-g-aPP |
| 4 | 4 | — | Linear | iPP |
| 5 | 1 | 4 | Comb-block | iPP-g-aPP |
| 6 | 1 | 4 | Comb-block | iPP-g-aPP |
| 7 | 2 | — | Comb-block | aPP |
| 8 | 1 | 2 | Highly Comb-blocked | aPP-g-aPP |

*aPP: atactic polypropylene
sPP: Polypropylene containing sydiotactic propylene sequences
iPP: Polypropylene containing isotactic propylene sequences The Van Gurp-Palmen plot is a plot of measured phase angle (tangent angle corresponding to the ratio of shear loss modulus to shear storage modulus) plotted against complex shear modulus. As shown in the plots of FIG. 1, Sample 1 has the linear polymer characteristic of a smooth curved-down shape. For branched polymers, due to the increase in elasticity as a result of the long chain branches, a drop in phase angle at a given shear modulus would be found.

Typically, the lower the phase angle at 10,000 Pa complex modulus suggests more branches (or more complex branches).

Blending experiments were carried out using a polyalphaolefin (4 centipoise viscosity, 25° C.) as the base stock to study the viscosity shift versus the shear rate. Using an ultra-high shear viscometer (shear rate range from $10^6$ to $10^7$ l/s), a m-VROC micro-capillary viscometer (shear rate range from $10^3$ to $10^6$ l/s), and an ANTON-PAAR rheometer (shear rate range from 1 to $10^3$ l/s) operating at various temperatures, viscosity values as functions of shear rate and temperature can be obtained for mixtures of the PAO with the inventive viscosity modifiers. Based on the principle of time-temperature correspondence [Aklonis, J. J., and MacKnight, W. J., "Introduction to Polymer Viscoelasticity", Chapter 3 ($2^{nd}$ ed., John Wiley and Sons, New York, 1983)], time-temperature superposition (TTS) was then applied to consolidate all measured data into one single viscosity master curve at a reference temperature of 100° C. using shift factors. Thus, obtained viscosity curve can be fitted to a five-parameter non-Newtonian Carreau-Yasuda model as shown below.

$$\frac{\eta - \eta_\infty}{\eta_0 - \eta_\infty} = [1 + (\lambda \dot{\gamma})^a]^{(n-1)/a}$$

Figure 2:
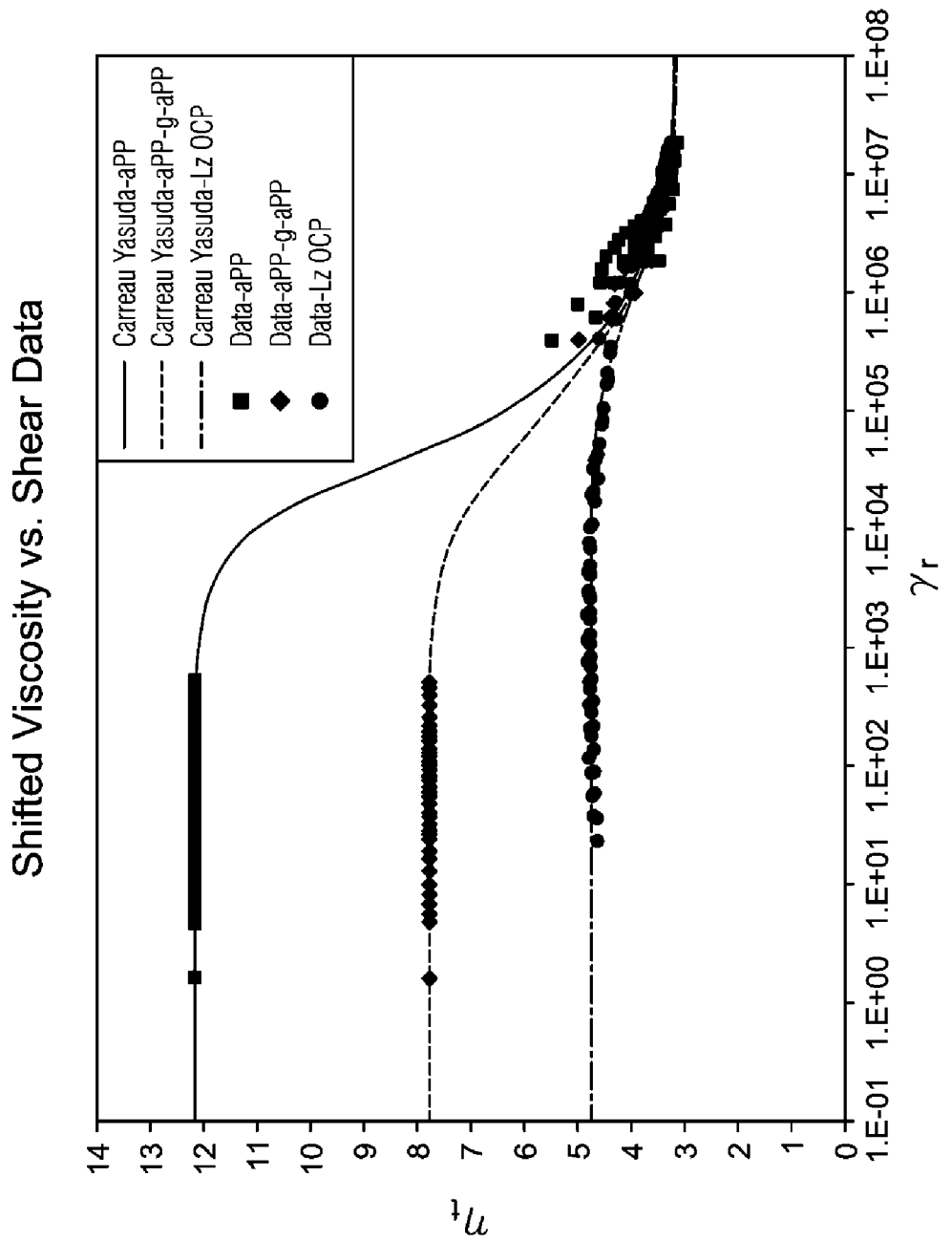
FIG. 2 is a Carreau Yasada plot for inventive atactic polypropylene comb-block polyolefins and comparative viscosity modifiers which is a plot of the viscosity as a function of shear rates.

This is a pseudoplastic flow model with asymptotic viscosities at zero ($h_0$) and infinite ($h_\infty$) shear rates and with no yield stress. The parameter $1/\lambda$ (inside the bracket) is the critical shear rate at which viscosity begins to decrease, or onset of the shear thinning, and the power-law slope is (n−1), which is the shear thinning slope. The parameter "a" represents the width of the transition region between zero shear viscosity and the power-law region, or the transition from Newtonian to shear thinning. The infinite viscosity in this case is set to the base stock PAO viscosity. FIG. 2 are plots of viscosity as a function of shear rate, where the solid lines are the Carreau-Yasuda fits of Samples. The bottom curve is a commercial OCP (olefin copolymer) viscosity modifier, a random copolymer of propylene and butene with a weight average molecular weight of 250,000 g/mole from Lubrizol ("LzOCP"). As indicated in FIG. 2, all the inventive compositions have a higher zero shear rate viscosity, hence, a higher thickening efficiency while delivering earlier shear thinning onset than that of LzOCP.

B. Processability Modifier Example

Two runs were performed to synthesize sample poly (ethylene/propylene-b-propylene) comb blocks in modifiers 1 and 2 ("Modifiers") and carried out in a continuous stirred tank reactor system with two reactors configured in series. The first reactor was a 0.5-liter and the second reactor was a 1 liter. Both reactors were stainless steel autoclave reactors and were equipped with a stirrer, a water cooling/steam heating element (with a temperature controller), and a pressure controller. Solvents and comonomers were first purified by passing through a three-column purification system. The purification system consisted of an Oxiclear column (model RGP-R1-500 from Labclear) followed by a 5 A and a 3 A molecular sieve column. Purification columns were regenerated periodically whenever there was evidence of lower activity of polymerization. Both the 3 A and 5 A molecular sieve columns were regenerated in-house under nitrogen at a set temperature of 260° C. and 315° C., respectively. The molecular sieve material was purchased from Aldrich. The Oxiclear column was regenerated as described by the manufacture. Ethylene was delivered as a gas solubilized in the chilled solvent/monomer mixture. The purified solvents and monomers were then chilled to about −15° C. by passing through a chiller before being fed into the reactors through a manifold. Solvent and monomers were mixed in the manifold and fed into reactor through a single tube. Catalyst and monomer contacts took place in the reactor. All liquid flow rates were measured using Brooksfield mass flow controllers.

The reactors were first prepared by continuously $N_2$ purging at a maximum allowed temperature, then pumping isohexane and scavenger solution through the reactor system for at least one hour. Monomers and catalyst solutions were then fed into the reactor for polymerization. Once the activity was established and the system reached equilibrium, the reactor was lined out by continuing operation of the system under the established condition for a time period of at least five times of mean residence time prior to sample collection. The resulting mixture, containing mostly solvent, polymer and unreacted monomers, was collected in a collection box. The collected sample modifiers were washed with xylene to remove unreacted macromonomers, and then air-dried in a hood to evaporate most of the solvent followed by drying in a vacuum oven at a temperature of about 90° C. for about 12 hours. The vacuum oven dried sample modifiers were weighed to obtain yields. All the reactions were carried out at a gauge pressure of about 2.4 MPa.

The catalyst used in the first reactor for the production of vinyl-terminated polypropylene was rac-dimethylsilyl bis(2-methyl-3-propyl-indenyl) hafnium dimethyl (Catalyst 1) and the activator was N,N-dimethylanilinium tetrakis(heptafluoro-2-naphthyl) borate. The catalyst used in the second reactor to copolymerize ethylene and vinyl-terminated polypropylene was p-triethylsilylphenylcarbyl bis(cyclopentadienyl)(2,7-di-t-butylfluorenyl) hafnium dimethyl (Catalyst 2) activated by dimethylanilinium tetrakis(pentafluorophenyl) borate. A small amount of propylene was carried over to the second reactor. Both catalysts were pre-activated with the activator at a molar ratio of about 1:1 in 900 ml of toluene. All catalyst solutions were kept in an inert atmosphere and fed into reactors using an ISCO syringe pump. Tri-n-octylaluminum (TNOAL) solution (available from Sigma Aldrich, Milwaukee, Wis.) was further diluted in isohexane and used as a scavenger. Scavenger feed rate was adjusted to maximize the catalyst efficiency.

In Modifiers 1 and 2, solvent, pre-activated Catalyst 1 solution, scavenger solution and propylene were fed into the first reactor to produce vinyl-terminated polypropylene. Then the contents of the first reactor were transferred into the second reactor. Pre-activated catalyst 2 solution, ethylene and additional solvent were fed into the second reactor. About 10 gram of product was collected from the first reactor for characterization and calculation of yield. The final product was collected from the second reactor. The catalyst feed rate was adjusted to achieve the yield and monomer conversion. In Table 2A, polymerization conditions and characterization results for vinyl-terminated polypropylene from Reactor 1 are tabulated.

The molecular weight, as measured by proton NMR and by GPC-3D, of the vinyl-terminated atactic polypropylene from the first reactor exceeds the target weight average molecular weight of 8,000 or 10,000 g/mole which satisfies the requirement of greater than the entanglement molecular weight of atactic polypropylene of 7,050 g/mole (see 31(4) MACROMOLECULES, 1335-1340 (1998)).

TABLE 2A

Polymerization Conditions for Process Modifier Example and Results

| Modifier | 1 | 2 |
|---|---|---|
| Reactor 1 | | |
| Volume (ml) | 500 | 500 |
| Temperature (° C.) | 50 | 55 |
| Propylene feed rate (g/min) | 5 | 10 |
| Isohexane feed rate (g/min) | 16.7 | 16.7 |
| Catalyst 1 feed rate (mole/min) | 1.83E−07 | 1.83E−07 |
| Yield (g) | 39.3 | 31.7 |
| Conversion | 0.786 | 0.317 |
| Catalyst 1 efficiency (g polymer/g catalyst) | 35,370 | 28,530 |
| Vinyl chain end (%) | 81 | 84 |
| Vinylidene chain end (%) | 19 | 16 |
| Mn ($^1$H NMR) (g/mole) | 8,851 | 16,098 |
| GPC Mn (g/mole) | 11,517 | 17,791 |
| GPC Mw (g/mole) | 291,138 | 113,684 |
| GPC MWD (Mw/Mn) | 2.53 | 6.39 |
| Tg (midpoint, ° C.) | −9.8 | −3.0 |
| LCB (long chain branching) | No | No |
| Reactor 2 | | |
| Volume (ml) | 1,000 | 1,000 |
| Temperature (° C.) | 130 | 130 |
| Ethylene feed rate (liter/min) | 8 | 8 |
| Isohexane feed rate (g/min) | 52.5 | 52.5 |
| Catalyst 2 feed rate (mole/min) | 5.89E−08 | 5.89E−08 |
| Conversion | 0.83 | 0.82 |
| Catalyst 2 efficiency (g polymer/g catalyst) | 70,240 | 93,996 |

Figure 3:
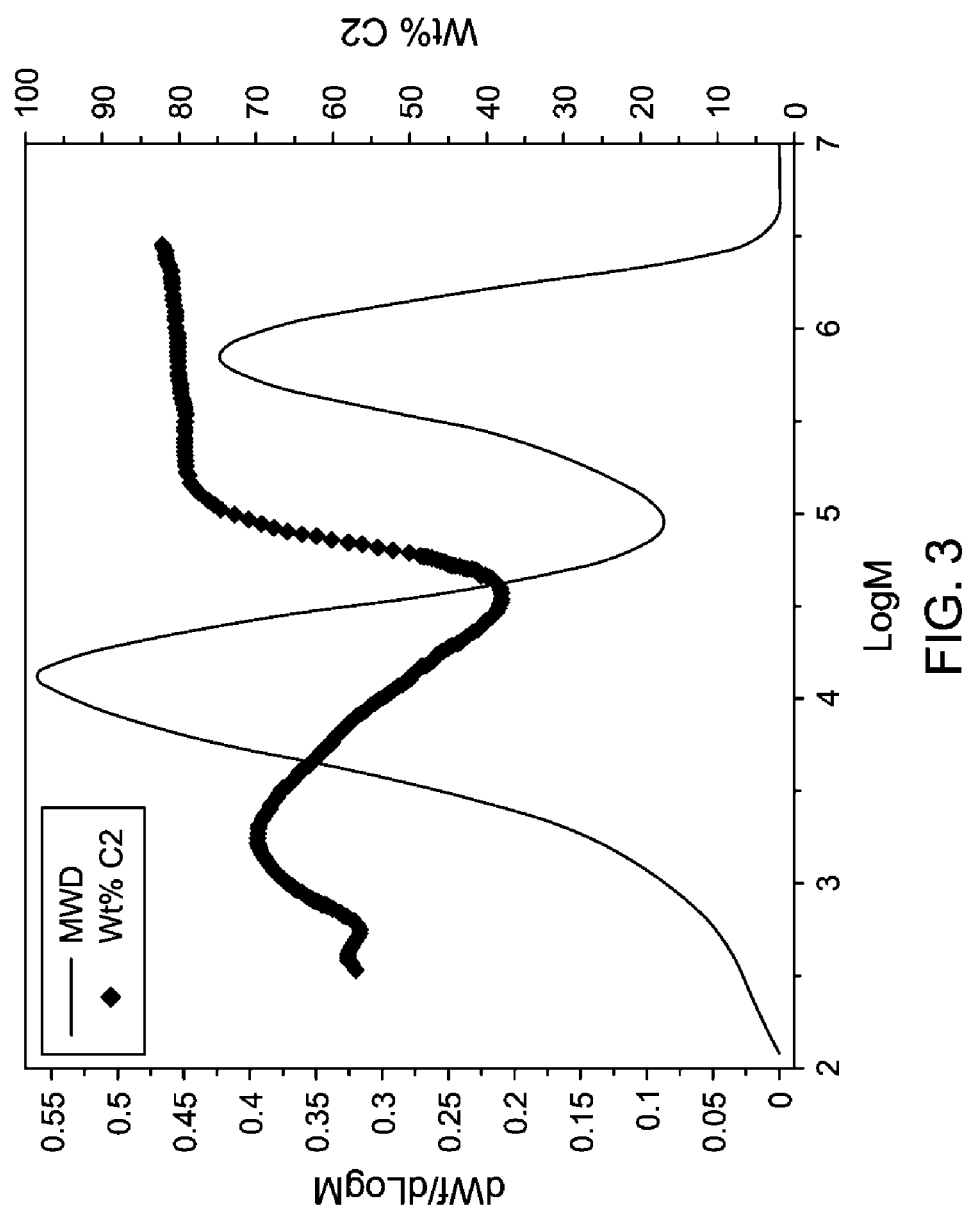
FIG. 3 is a GPC plot of an inventive processability atactic polypropylene comb-block polyolefins ("modifier 1") where the peak to the left (low molecular weights) represents the linear low molecular weight component (LLMW) and the second peak (at high molecular weights) represents the atactic polypropylene comb-block polyethylene.
Figure 4:
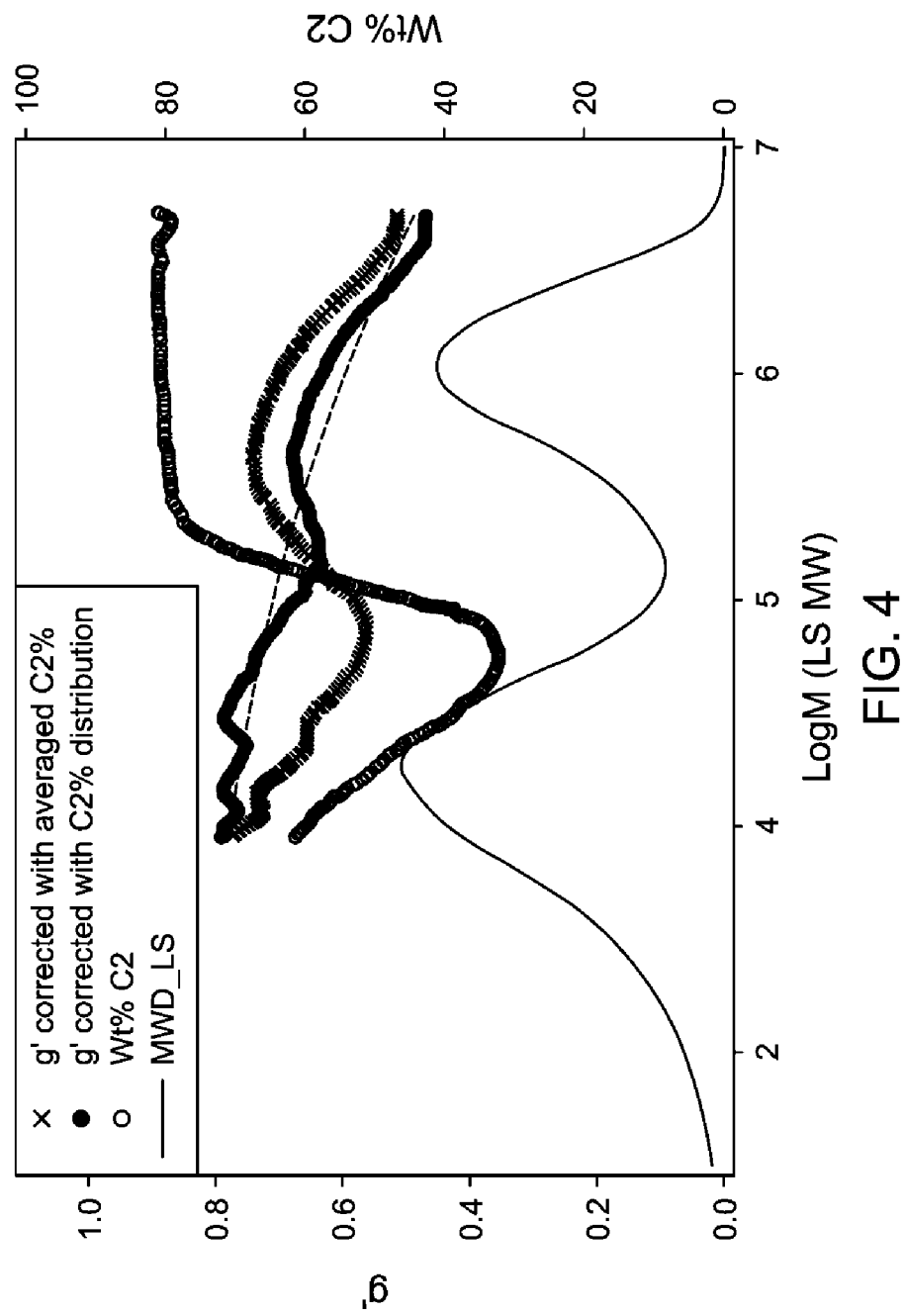
FIG. 4 is a GPC plot of the inventive modifier 1 showing the corrected long chain branch index, g', corrected for the propylene content (presence of short chain branches, methyl from propylene comonomer).

The GPC-4D MW and composition (from infrared detector) plots are shown in FIGS. 3 and 4. There are no gels in both Modifiers and 100% recovery was achieved during the GPC testing. Both show distinct bimodal MWD (Mw/Mn). The long chain branch index, g', needed to be corrected for the propylene content since the presence of short chain branches, methyl from propylene comonomer, would lead to smaller coil dimensions. As shown in FIG. 4, after the correction, the low molecular weight fractions are linear and the high molecular weight fractions are comb-block. In Modifier 2, higher propylene loading in the first reactor led to higher molecular weight for the vinyl-terminated atactic polypropylene. But at the same time, more unreacted propylene monomers were fed into the second reactor, which diluted the ethylene backbone resulting in lower density, more extractable, and lower molecular weight. The extractable portions in both examples are linear low molecular weight and low density ethylene-propylene copolymers and atactic polypropylene. Subsequently, only Modifier 1 was used as the processability modifier in PE, PP and PE/PP blends for rheological and morphological evaluations, the GPC plot of which is in FIG. 3. The peak to the left (low molecular weights) represents the linear low molecular weight component (LLMW) and the second peak (at high molecular weights) represents the atactic polypropylene comb-block polyethylene. The characterization of the Modifiers 1 and 2 are in Table 2B.

TABLE 2B

Characterizations of Modifiers 1 and 2

| Modifier | 1 | 2 |
|---|---|---|
| Density (g/cm$^3$) | 0.895 | 0.877 |
| Extractable by Soxhlet extraction (%) | 15 | 66 |
| Melting temperatures of polyethylene backbone and atactic polypropylene (peak, ° C.) Tm | 92/107 | 73/90 |
| Glass transition temperature (midpoint, ° C.) | −7 | −8 |
| GPC | | |
| Molecular weight distribution | Bimodal | Bimodal |
| Mn (g/mole) | 5,101 | 4,337 |
| Mw (g/mole) | 326,464 | 273,231 |
| Mz (g/mole) | 1,355,177 | 1,103,650 |
| Mw/Mn | 64.3 | 63.0 |
| $^{13}$CNMR | | |
| Mole % ethylene | 63.7 | 48.4 |
| Mole % propylene | 32.4 | 46.7 |
| CH branch mole % (Long chain branched) | 3.9 | 5.0 |
| Sequence distribution [EEE] | 0.587 | 0.394 |
| Sequence distribution [PPP] | 0.287 | 0.438 |

Figure 5:
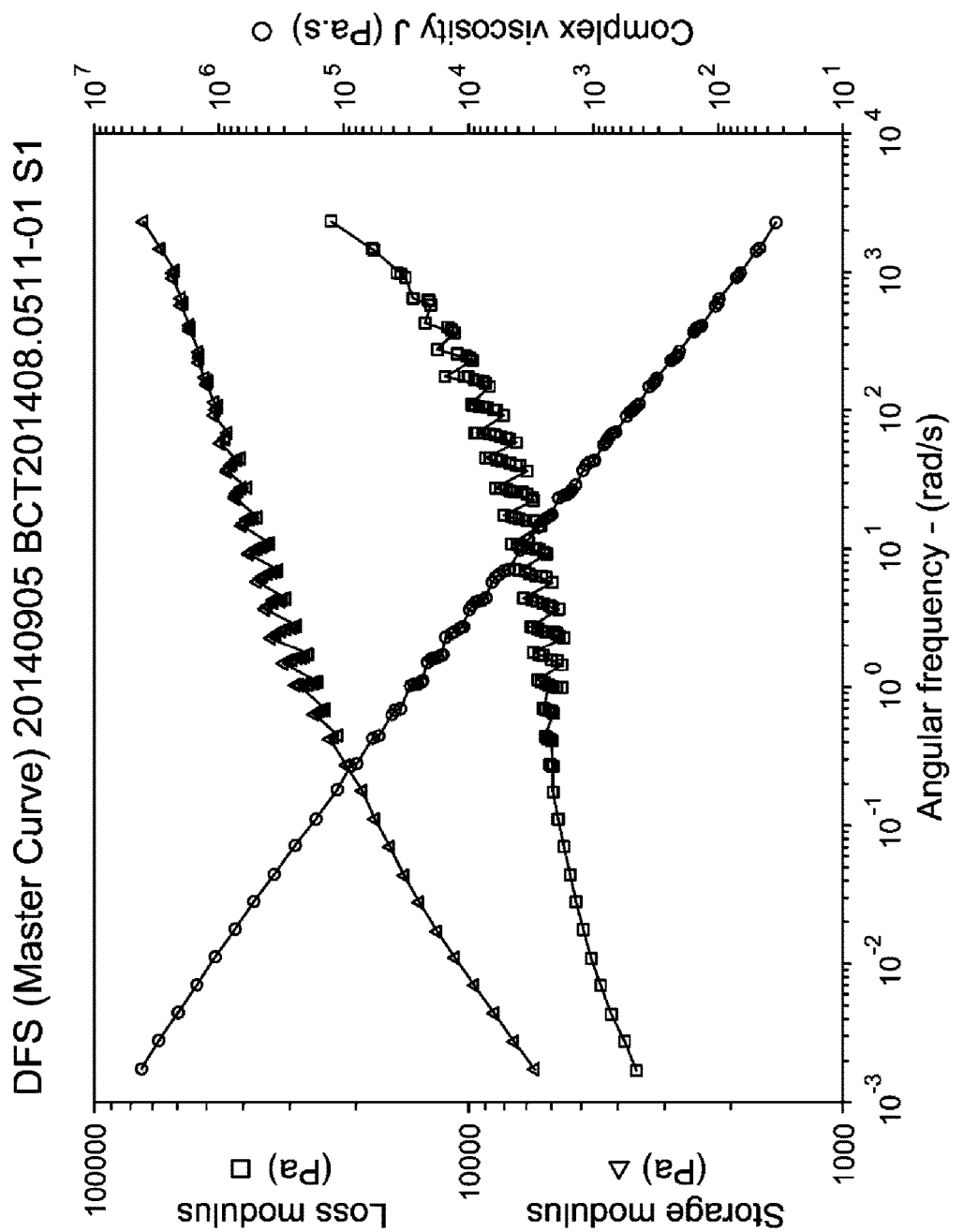
FIG. 5 is a time-temperature dependent plots of the storage and loss modulus as a function of angular frequency demonstrating thermo-rheological complex due to the combed-block nature of modifier 1.
Figure 6:
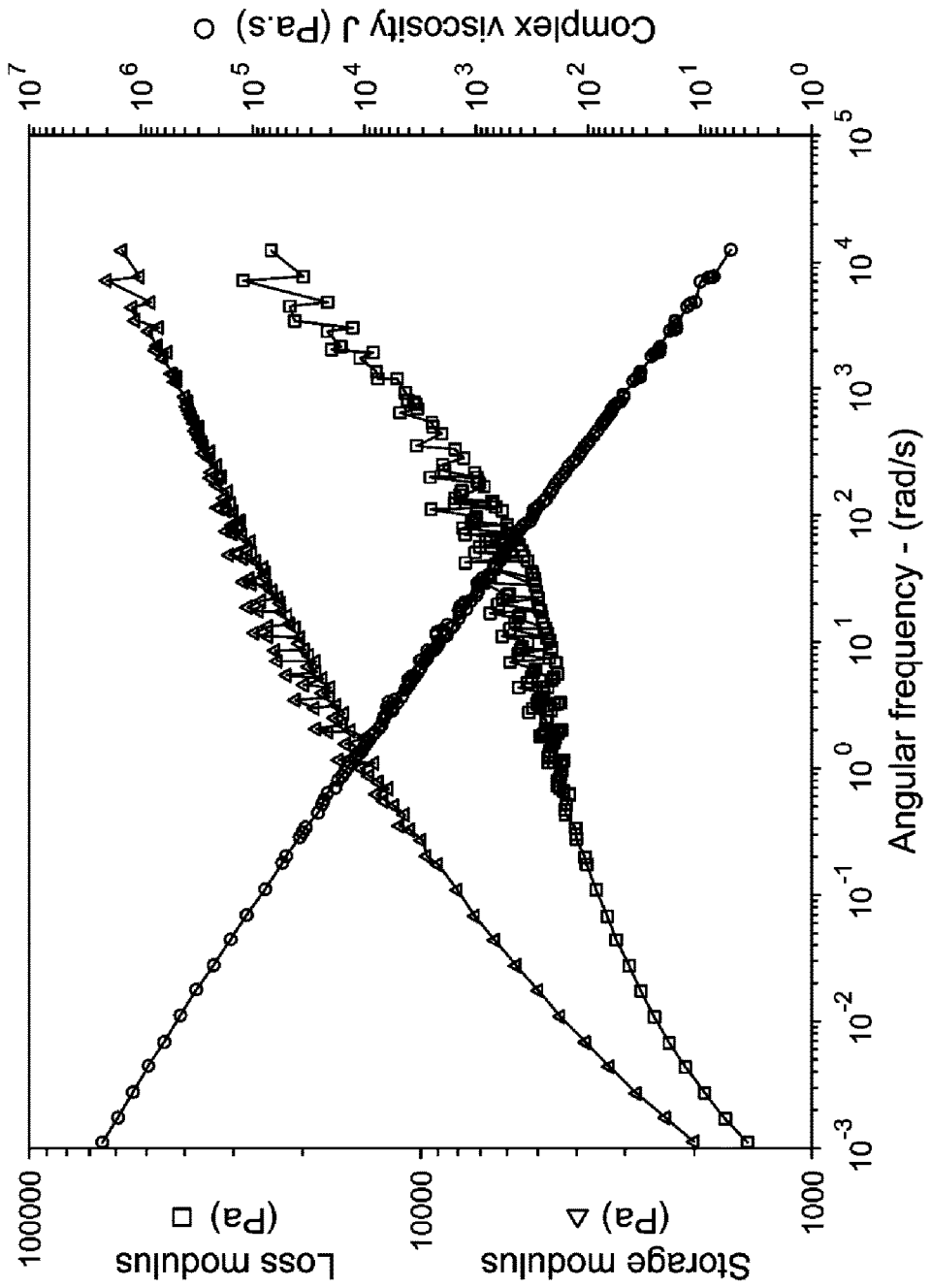
FIG. 6 is a time-temperature dependent plots of the storage and loss modulus as a function of angular frequency demonstrating thermo-rheological complex due to the combed-block nature of modifier 2.

As shown in FIGS. 5 and 6, time-temperature superposition failed on Modifiers 1 and 2 since they are thermorheological complex due to their combed-block nature. Time-Temperature superposition, derived from time-temperature correspondence principle (Aklonis, J. J., and MacKnight, W. J., "Introduction to Polymer Viscoelasticity", 2nd ed., John Wiley and Sons, New York, (1983), Chapter 3), should be applicable to all polymers, linear and branched, of homogeneous compositions. The inabilities to superimpose the curves of these example comb-block polyolefins by time-temperature shifting demonstrates that comb blocks were made where the combs are of different compositions to that of the backbone. The failure of the time-temperature superposition can be used to suggest the successful incorporation of atactic polypropylene combs into the polyethylene backbone.

Their block copolymer characteristics can also be observed from the atactic polypropylene comb block polyolefins' thermal properties. A random copolymer of ethylene-propylene with density of 0.895 g/cm$^3$ or lower would have a Tm less than 90° C. and a Tg less than −30° C. Instead, it was found that the Tm of polyethylene and Tg of atactic polypropylene in these two Modifiers was higher than this. Due to the melting temperature suppression by block copolymerization through the DiMarzio-Guttman-Hoffman theory (13 MACROMOLECULES, 1194 (1980)), it is difficult to determine the propylene content in the backbone of these comb-block copolymers through their melting temperature. If one estimates that the Tm is suppressed by 15° C. through copolymerization using the DGH theory, the propylene content in the backbone of Modifier 1 may be estimated to be around 5 to 10 wt %. One can estimate the structure of the high MW comb-block fractions using the GPC, $^{13}$C NMR, $^1$H NMR, and reactor conversion data. On average, the comb block structure in Modifier 1 has 17 combs (branches originating from the polyethylene backbone) and with a weight average molecular weight of 42,000 g/mole in between combs.

Figure 7:
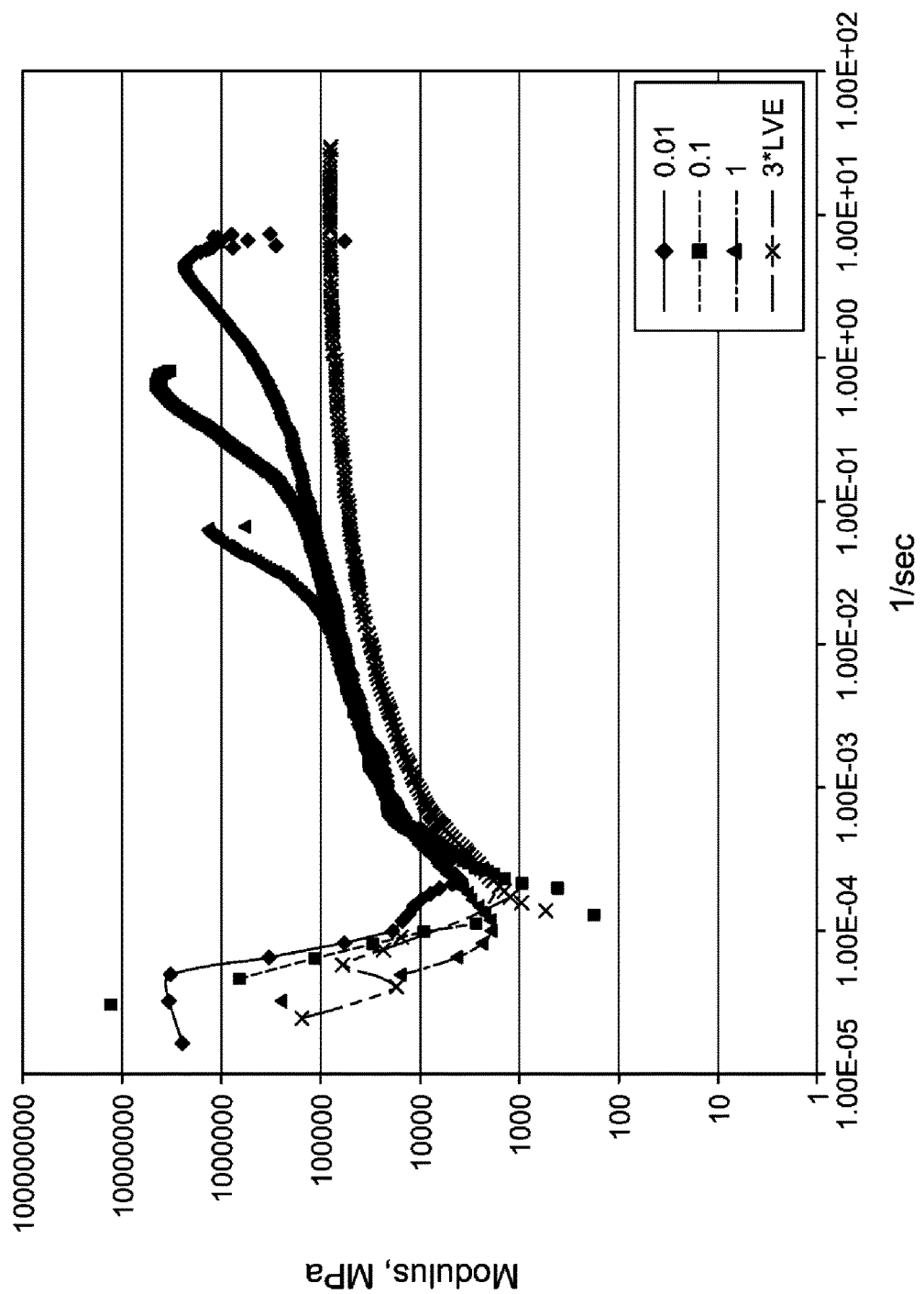
FIG. 7 is a plot of Modulus as a function of shear rate to demonstrate extensional flow hardening of a 50/50 polyethylene/polypropylene blend containing 5% modifier 1 at 190° C.

Solution blending of Modifier 1 into PE1 (HDPE, high density polyethylene, density of 0.957 g/cm$^3$, no comonomer, Mn=25,000 g/mole, Mw=193,000 g/mole), PP1 (polypropylene, PP1701, Mn=82,000 g/mole, Mw=387,000 g/mole), and PE1/PP1 75/25, 50/50, and 25/75 blends was conducted at 150° C. using dichlorobenzene (o-DCB) as the solvent at 1% and 5%. 1% and 5% blends of Modifier 1 into PE2 (HDPE 6908.19, ExxonMobil Chemical Company) and PP1 50/50 blends were also made. An amount of 0.5 wt % of BHT antioxidant was added in all solution blends. Their extensional rheologies were measured using a SER (Sentmanat Extensional Rheometer) at 190° C. and their extensional flow behavior are documented in Table 2C. In FIG. 7, the extensional flow hardening of 50/50 PE1/PP1 blend containing 5% Modifier 1 at 190° C. is shown as an example.

TABLE 2C

Extensional flow behavior of PE, PP, and PE/PP

| Linear Matrix | Wt % of Modifier 1 | Extensional Flow Hardening |
| --- | --- | --- |
| PE1 | 0 | No |
| PE1 | 1 | Yes |
| PE1 | 5 | Yes (strong) |
| PP1 | 0 | No |
| PP1 | 1 | No |
| PP1 | 5 | Yes |
| 75/25 PE1/PP1 | 0 | No |
| 75/25 PE1/PP1 | 5 | Yes |
| 50/50 PE1/PP1 | 0 | No |
| 50/50 PE1/PP1 | 5 | Yes (strong) |
| 25/75 PE1/PP1 | 0 | No |
| 25/75 PE1/PP1 | 5 | Yes (weak) |
| 50/50 PE2/PP1 | 0 | No |
| 50/50 PE2/PP1 | 1 | Yes (strong) |
| 50/50 PE2/PP1 | 5 | Yes (strong) |

In addition to delivering extensional flow hardening in PE, PP, and PE/PP blends by adding Modifier 1, it can also compatibilize the immiscible polyethylene (PE) and polypropylene (PP) blends. SEM (Scanning Electron Microscopy) micrographs of 50/50 PE1/PP1 and PE2/PP2 blends before and after 5% addition of demonstrates a reduction in the co-continuous domain sizes and can be clearly seen demonstrating the compatibilizing effects of Modifier 1.

Having described the various aspects of the inventive atactic polypropylene comb-block polyolefins and methods of making them, described here in numbered paragraphs is:
P1. A process for preparing atactic polypropylene comb-block polyolefins comprising (or consisting essentially of, or consisting of) contacting, at a temperature within a range from 20 to 55 or 60 or 65 or 70° C., propylene with a first metallocene precursor and an activator to form vinyl-terminated atactic polypropylene having a weight average molecular weight of at least 8000 or 10,000 g/mole and a crystallinity of less than 20 or 10 or 5%; and contacting, at a temperature within a range from 40 to 55 or 60 or 70 or 90 or 130 or 150° C., the vinyl-terminated atactic polypropylene with ethylene, propylene, or both, a second metallocene precursor, and an activator to form atactic polypropylene comb-block polyolefins.
P2. The process of numbered paragraph 1, wherein the first metallocene precursor is selected from the group consisting of bridged $C_2$ symmetric hafnocenes and zirconocenes; preferably symmetrically C1 to C6 alkyl substituted.
P3. The process of numbered paragraphs 1 or 2, wherein the atactic polypropylene comb-block polyolefin is an atactic polypropylene comb-block polypropylene having a weight average molecular weight within the range from 50,000 to 500,000 g/mole.
P4. The process of any one of the previous numbered paragraphs, wherein the atactic polypropylene comb-block polyolefin is an atactic polypropylene comb-block polyethylene having a weight average molecular weight within the range from 100,000 to 5,000,000 g/mole.
P5. The process of any one of the previous numbered paragraphs, further comprising forming a linear low molecular weight component (LLMW), preferably in the second "contacting" (e.g., second step in a single reactor or second reactor in a series) comprising ethylene or ethylene/propylene copolymers and having a number average molecular weight within a range from 7,000 to 50,000 g/mole.
P6. The process of any one of the previous numbered paragraphs, wherein the contacting takes place in the same reactor (e.g., one reactor, two steps or zones).
P7. The process of any one of the previous numbered paragraphs, wherein the contacting takes place in different reactors (e.g., serial reactors).
P8. The process of any one of the previous numbered paragraphs, wherein the first metallocene and/or second metallocene is selected from those having the following structure:

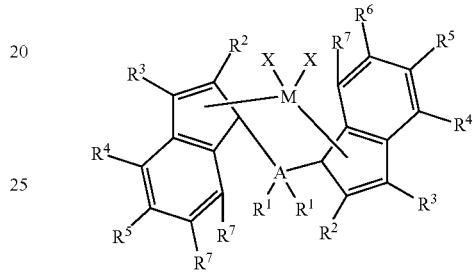

wherein: M is a Group 4 metal, preferably Zr or Hf, most preferably Hf; each X is independently a halogen or C1 to C10 alkyl, or C6 to C10 aryl; "A" is a methylene or ethylene, wherein the ethylene has two $R^1$ groups on each carbon, or "A" is a silane; each $R^1$ is independently selected from hydrogens, C1 to C10 alkyls, and C6 to C10 aryls; each of $R^2$ to $R^7$ is independently selected from hydrogens, C1 to C10 alkyls, C6 to C10 aryls, C7 to C24 alkylaryls, and C7 to C24 arylalkyls; preferably each of $R^5$ to $R^7$ are hydrogen, $R^2$ is a C1 to C4 alkyl, and $R^3$ is a C2 to C6 alkyl; and wherein $R^2$ and $R^3$ may form a C4 to C7 saturated or unsaturated ring.
P9. The process of any one of the previous numbered paragraphs, wherein (preferably when serial reactors are used) the GPC of the atactic polypropylene comb-block polyolefins exhibits bimodal molecular weight distribution.
P10. The process of any one of the previous numbered paragraphs, wherein (preferably when serial reactors are used) the atactic polypropylene comb-block polyolefins has a z-average molecular weight of greater than 500,000 or 750,000 or 900,000 g/mole.
P11. The process of any one of the previous numbered paragraphs, wherein (preferably when serial reactors are used) the atactic polypropylene comb-block polyolefins has a molecular weight distribution (Mw/Mn) greater than 10 or 30 or 50, or within a range from 10 or 30 or 50 to 100 or 140 or 160.
P12. The process of any one of the previous numbered paragraphs, wherein the atactic polypropylene comb-block polyolefin (preferably polyethylene) exhibits a CH branching number (mole %, $^{13}C$ NMR) greater than 1 or 1.5 or 2, or within a range from 1 or 1.5 or 2 to 7 or 9 or 12 or 15.
P13. The process of any one of the previous numbered paragraphs, wherein the atactic polypropylene comb-block polyolefins has a comb number 2 or 4 or 6 or 10 or more; or within a range from 2 or 4 or 6 or 10 to 20 or 24 or 28 or 32.

P14. The process of any one of the previous numbered paragraphs, wherein the second metallocene precursor is selected from $C_s$ symmetric bis-cyclopentadienyl Group 4 complexes, $C_2$ symmetric bis-cyclopentadienyl Group 4 complexes, and mono-cyclopentadienyl Group 4 complexes.
P15. The process of any one of the previous numbered paragraphs, wherein the second metallocene precursor is selected from those having the following structure:

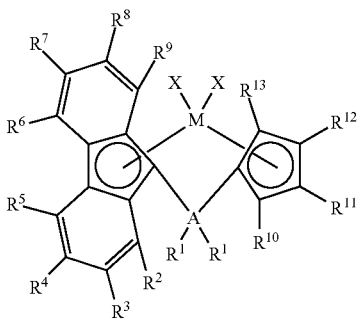

wherein: M is a Group 4 metal, preferably Zr or Hf; each X is independently a halogen or C1 to C10 alkyl, or C6 to C10 aryl; "A" is a methylene or ethylene, wherein the ethylene has two $R^1$ groups on each carbon, or "A" is a silane; each $R^1$ is independently selected from hydrogens, C1 to C10 alkyls, and C6 to C10 aryls; each of $R^2$ to $R^{13}$ is independently selected from hydrogens, C1 to C10 alkyls, C6 to C10 aryls, C7 to C24 alkylaryls, and C7 to C24 arylalkyls; preferably each of $R^3$ and $R^8$ are a C2 to C6 iso- or tert-alkyls, and the other R groups are hydrogen; and wherein $R^2$ and $R^3$ may form a C4 to C7 saturated or unsaturated ring.
P16. The process of any one of the previous numbered paragraphs, wherein the second metallocene precursor is selected from those having the following structure:

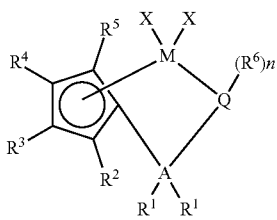

wherein: M is a Group 4 metal, preferably Ti; each X is independently a halogen or C1 to C10 alkyl, or C6 to C10 aryl; "A" is a methylene or ethylene, wherein the ethylene has two $R^1$ groups on each carbon, or "A" is a silane; Q is a heteroatom or hydrocarbon group; preferably a carbon, nitrogen, silicon, or phosphorous; wherein "n" is 1, 2, or 3; each $R^1$ is independently selected from hydrogen, C1 to C10 alkyls, and C6 to C10 aryls; each of $R^2$ to $R^5$ is independently selected from hydrogens, C1 to C10 alkyls, C6 to C10 aryls, C7 to C24 alkylaryls, and C7 to C24 arylalkyls; and wherein $R^6$ is selected from C1 to C10 alkyls, and C4 to C20 saturated or unsaturated rings.
P17. The process of any one of the previous numbered paragraphs, wherein at least the first contacting (or stage or step) takes place at a pressure of at least 1 or 2 MPa, or within a range from 1 or 2 MPa to 4 or 6 or 8 MPa.

P18. The process of any one of the previous numbered paragraphs, wherein the activator is a tetra(perfluorinated aromatic)borate.
P19. An atactic polypropylene comb-block polyolefin comprising two blocks (or components): a polyolefin backbone; and one or more (preferably two or more) atactic polypropylene combs pendant to the backbone having a weight average molecular weight of at least 8,000, or 10,000 g/mole and a crystallinity of less than 20 or 10 or 5%; wherein the atactic polypropylene comb-block polyolefin has a comb number of at least 2 or 4 or 6 or 10.
P20. The atactic polypropylene comb-block polyolefin of numbered paragraph 19, wherein the polyolefin is an isotactic polypropylene, a syndiotactic polypropylene, an ethylene-propylene copolymer, or polyethylene.
P21. The atactic polypropylene comb-block polyolefin of any one of numbered paragraphs 19 or 20, wherein (preferably when synthesized using the serial reactor process) the atactic polypropylene comb-block polyolefin exhibits bimodal molecular weight distribution, preferably the GPC chromatogram exhibits two separate peaks.
P22. The atactic polypropylene comb-block polyolefin of any one of numbered paragraphs 19 to 21, wherein (preferably when synthesized using a serial reactor process) the atactic polypropylene comb-block polyolefin has a number average molecular weight within the range from 4,000 g/mole to 30,000 g/mole.
P23. The atactic polypropylene comb-block polyolefin of any one of numbered paragraphs 19 to 22, wherein (preferably when synthesized using a serial reactor process) the atactic polypropylene comb-block polyolefin has a z-average molecular weight of greater than 500,000 or 750,000 or 900,000 g/mole.
P24. The atactic polypropylene comb-block polyolefin of any one of numbered paragraphs 19 to 23, wherein (preferably when synthesized using a serial reactor process) the atactic polypropylene comb-block polyolefin has a molecular weight distribution (Mw/Mn) greater than 10 or 30 or 50, or within a range from 10 or 30 or 50 to 100 or 140 or 160.
P25. The atactic polypropylene comb-block polyolefin of any one of numbered paragraphs 19 to 24, wherein the atactic polypropylene comb-block polyolefin exhibits a CH branching number (mole %, $^{13}$C NMR) greater than 1 or 1.5 or 2, or within a range from 1 or 1.5 or 2 to 7 or 9 or 12 or 15; wherein the backbone is preferably polyethylene.
P26. A modifier for a hydrocarbon fluid or polyolefin composition comprising within the range from 0.05 wt % to 15 wt % of the atactic polypropylene comb-block polypropylene of any one of the previous numbered paragraphs.
P27. A modifier for polyethylenes and polypropylenes and their blends comprising within the range from 0.05 wt % to 15 wt % of the atactic polypropylene comb-block polyethylene of any one of the previous numbered paragraphs.

Also claimed, is the use of an atactic polypropylene comb-block polyolefins in a hydrocarbon fluid or a polyolefin composition.

Also claimed, is the use of a two stage polymerization process using at least two different metallocenes, to produce the atactic polypropylene comb-block polyolefin described herein.

For all jurisdictions in which the doctrine of "incorporation by reference" applies, all of the test methods, patent publications, patents and reference articles are hereby incorporated by reference either in their entirety or for the relevant portion for which they are referenced.

What is claimed is:

1. A process for preparing comb-block polyolefins comprising:
    contacting, at a temperature within a range from 20 to 70° C., propylene with a first metallocene precursor and an activator to form vinyl-terminated atactic polypropylene having a weight average molecular weight of at least 8000 g/mole and a crystallinity of less than 20%;
    contacting in a subsequent step, at a temperature within a range from 40 to 150° C., the vinyl-terminated atactic polypropylene with ethylene, propylene, or both, a second metallocene precursor, and an activator to form a comb-block polyolefin; and
    forming in said subsequent step a linear low molecular weight component (LLMW) comprising ethylene or ethylene/propylene copolymers and having a number average molecular weight within a range from 7,000 to 50,000 g/mole,
    wherein the comb-length of the comb-block polyolefin is greater than the entanglement molecular weight of atactic polypropylene.

2. The process of claim 1, wherein the first metallocene precursor is selected from the group consisting of bridged $C_2$ symmetric hafnocenes and zirconocenes.

3. The process of claim 1, wherein the comb-block polyolefin is a comb-block polypropylene having a weight average molecular weight within the range from 50,000 to 500,000 g/mole.

4. The process of claim 1, wherein the comb-block polyolefin is a comb-block polyethylene having a weight average molecular weight within the range from 100,000 to 5,000,000 g/mole.

5. The process of claim 1, wherein the contacting steps occur in the same reactor.

6. The process of claim 1, wherein the contacting steps occur in different reactors.

7. The process of claim 1, wherein the first metallocene and/or second metallocene is selected from those having the following structure:

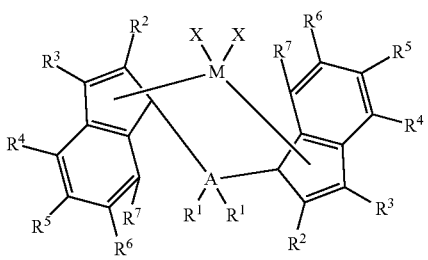

wherein M is a Group 4 metal;
each X is independently a halogen or C1 to C10 alkyl, or C6 to C10 aryl;
"A" is a methylene or ethylene, wherein the ethylene has two $R^1$ groups on each carbon, or "A" is a silane;
each $R^1$ is independently selected from hydrogens, C1 to C10 alkyls, and C6 to C10 aryls;
each of $R^2$ to $R^7$ is independently selected from hydrogens, C1 to C10 alkyls, C6 to C10 aryls, C7 to C24 alkylaryls, and C7 to C24 arylalkyls; and
wherein $R^2$ and $R^3$ may form a C4 to C7 saturated or unsaturated ring.

8. The process of claim 1, wherein the GPC of the comb-block polyolefins exhibits bimodal molecular weight distribution.

9. The process of claim 1, wherein the comb-block polyolefins has a z-average molecular weight of greater than 500,000 g/mole.

10. The process of claim 1, wherein the comb-block polyolefins has a molecular weight distribution (Mw/Mn) greater than 10.

11. The process of claim 1, wherein the comb-block polyolefins have comb number of 2 or more.

12. The process of claim 1, wherein the second metallocene precursor is selected from $C_s$ symmetric bis-cyclopentadienyl Group 4 complexes, $C_2$ symmetric bis-cyclopentadienyl Group 4 complexes, and mono-cyclopentadienyl Group 4 complexes.

13. The process of claim 1, wherein the second metallocene precursor is selected from those having the following structure:

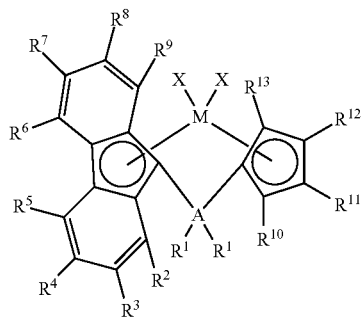

wherein M is a Group 4 metal;
each X is independently a halogen or C1 to C10 alkyl, or C6 to C10 aryl;
"A" is a methylene or ethylene, wherein the ethylene has two $R^1$ groups on each carbon, or "A" is a silane;
each $R^1$ is independently selected from hydrogens, C1 to C10 alkyls, and C6 to C10 aryls;
each of $R^2$ to $R^{13}$ is independently selected from hydrogens, C1 to C10 alkyls, C6 to C10 aryls, C7 to C24 alkylaryls, and C7 to C24 arylalkyls; and
wherein $R^2$ and $R^3$ may form a C4 to C7 saturated or unsaturated ring.

14. The process of claim 1, wherein the second metallocene precursor is selected from those having the following structure:

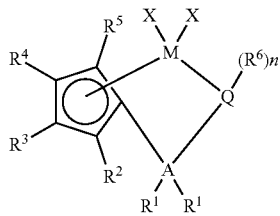

wherein:
M is a Group 4 metal;
each X is independently a halogen or C1 to C10 alkyl, or C6 to C10 aryl;
"A" is a methylene or ethylene, wherein the ethylene has two $R^1$ groups on each carbon, or "A" is a silane;
Q is a heteroatom or hydrocarbon group; wherein "n" is 1, 2 or 3;

each $R^1$ is independently selected from hydrogen, C1 to C10 alkyls, and C6 to C10 aryls;
each of $R^2$ to $R^5$ is independently selected from hydrogens, C1 to C10 alkyls, C6 to C10 aryls, C7 to C24 alkylaryls, and C7 to C24 arylalkyls; and
wherein $R^6$ is selected from C1 to C10 alkyls, and C4 to C20 saturated or unsaturated rings.

15. The process of claim 1, wherein at least the first contacting takes place at a pressure of at least 1 MPa.

* * * * *